May 16, 1961

L. E. LEMLEY 2,984,514

AUXILIARY BODY FOR WAGON VEHICLES

Filed March 28, 1958

INVENTOR.
LEON E. LEMLEY
BY
McMorrow, Berman & Davidson
ATTORNEYS

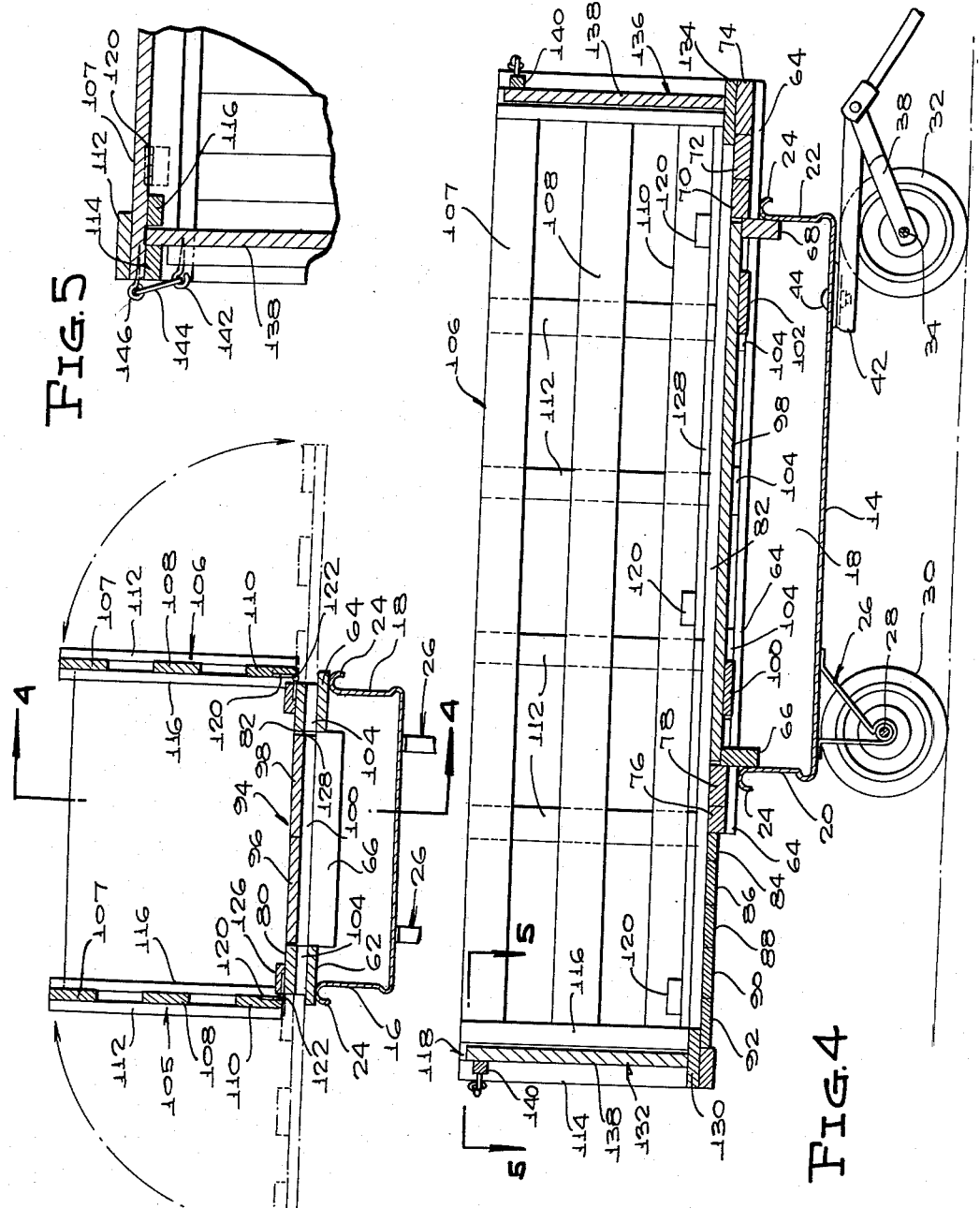

United States Patent Office 2,984,514
Patented May 16, 1961

2,984,514
AUXILIARY BODY FOR WAGON VEHICLES
Leon E. Lemley, 26 Fargo St., Warsaw, N.Y.

Filed Mar. 28, 1958, Ser. No. 724,725

3 Claims. (Cl. 296—14)

This invention relates to a vehicle body, and more specifically, the instant invention that pertains to an auxiliary body for a vehicle such as, for example, a child's wagon.

One of the primary objects of this invention is to provide an auxiliary body for a child's wagon or cart, wherein the carrying capacity of the vehicle is materially increased.

Another object of this invention is to provide an auxiliary body for a child's wagon or cart wherein the volumetric carrying capacity of the vehicle is increased and wherein the sides of the auxiliary body are foldable into, substantially, the plane of the bottom wall of the auxiliary body to increase the load bearing area thereof.

A further object of this invention is to provide an auxiliary body for a vehicle of the type described, the body being provided with means for releasably mounting the same on the vehicle in such a manner as to prevent inadvertent or accidental lateral or longitudinal shifting thereof relative to the vehicle.

A still further object of this invention is to provide an auxiliary body of the type described which is light in weight and which may be mounted on a vehicle or removed therefrom with facility. This invention also contemplates, as a further object thereof, the provision of an auxiliary body for a vehicle of the type referred to above, which is non-complex in construction and assembly, inexpensive to manufacture, and durable in use.

Other and further objects and advantages of the instant invention will become more evident from a consideration of the following specification when read in conjunction with the annexed drawings, in which:

Figure 3 is a detailed cross-sectional view taken substantially on the vertical plane of line 3—3 of Figure 1, looking in the direction of the arrows;

Figure 4 is a detailed cross-sectional view taken substantially on the vertical plane of line 4—4 of Figure 3, looking in the direction of the arrows; and Figure 5 is an enlarged fragmentary detailed cross-sectional view taken substantially on the horizontal plane of line 5—5 of Figure 4, looking in the direction of the arrows.

Figure 1:
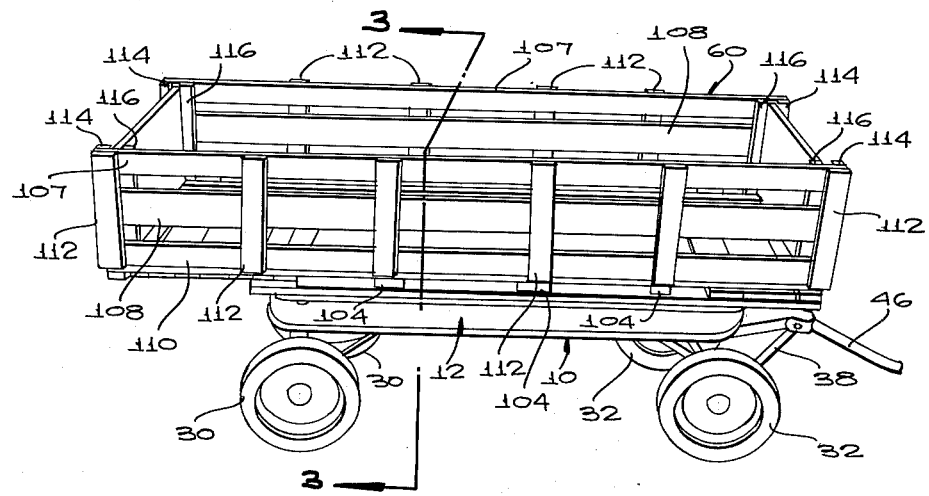
Figure 1 is a perspective view of a child's wagon or cart with the auxiliary body supported thereon in one of its operative positions.

Referring now more specifically to the drawings, reference numeral 10 designates, in general, a conventional wheeled vehicle such as, for example, a child's wagon of conventional construction and including a body 12 having a bed or bottom wall 14 having a substantially rectangular configuration and from which arise a pair of longitudinally extending, laterally spaced and substantially parallel upright side walls 16, 18 and a pair of longitudinally spaced and substantially parallel end walls 20, 22. The body 12 is preferably formed of a metallic material and the bottom, side and end walls are integrally formed therewith.

The upper ends of the side and end walls terminate in a continuous arcuately shaped peripheral flange 24.

Conventional rear axle brackets 26 depend from the outer side of the bottom wall 14 and support an elongated substantially cylindrical transversely extending axle 28 therein. The rear axle 28, at its respective opposed ends, has secured thereto for rotation thereon a pair of identically constructed ground engaging wheels 30.

The wagon 10 is supported at its forward end on a pair of ground engaging wheels 32 rotatably mounted on opposite ends, respectively, of a front axle 34. A substantially V-shaped element 36 has its arms 38 connected with the axle 34 adjacent the ends of the latter, and the apex 40 thereof is pivotally connected to the outer end of a longitudinally extending brace 42 the inner end of which is secured to the underside of the bottom wall 14 by bolts 44 or other conventional means.

An elongated handle 46 is provided with a bifurcated end 48 pivotally connected at 50 to the apex 40 of the element 36, and the opposite end of the handle 46 is connected with a hand grip 52.

The above briefly describes a vehicle such as a child's wagon which is conventional in all respects, and it is to be understood that the subject matter of this invention does not pertain to the specific details of the vehicle per se.

The auxiliary vehicle body to which this invention is specifically addressed is designated, in general, by reference numeral 60. The body 60 is substantially rectangular in configuration and includes a pair of elongated, laterally spaced and substantially parallel stringers 62, 64. A pair of cross braces 66, 68 extend transversely between and are secured to the stringers 62, 64 adjacent each of their respective ends. As is clearly seen in Figure 4, the cross braces 66, 68 extend above and depend below the stringers 62, 64 and the lower depending ends thereof are positioned so as to engage against the end walls 20, 22 of the vehicle 10 and serve as abutments to prevent the longitudinal shifting of the body 60 relative to the vehicle 10.

The bottom wall of the body 60 is formed by connecting the ends of a plurality of substantially flat rectangular members 70, 72 and 74 supported on the stringers 62, 64 adjacent the forward ends thereof and connecting a pair of similar substantially flat rectangular members 76, 78 on the rear ends thereof.

A pair of elongated substantially flat rectangular side frame members 80, 82 extend transversely across the opposed ends, respectively, of the members 70, 72, 74, 76 and 78 in laterally spaced and substantially parallel relation, the side frame members projecting rearwardly of the members 76, 78 to provide extensions to the underside of which are fixedly secured additional transversely extending substantially flat rectangular members 84, 86, 88, 90 and 92.

As it is seen in Figures 1 and 3, the members 70, 72, 74, 76, and 78 are all of the same length and the ends thereof terminate in inwardly spaced relation with respect to the outer marginal edges of the stringers 62, 64 to serve a function to be described. The members 84, 86, 88, 90 and 92 all have longitudinal dimensions equal in length to the length of the members 70, 72, and 74.

The floor includes a removable section 94 comprising a pair of longitudinally extending substantially flat rectangular members 96, 98 supported on cross braces 100, 102, adjacent their respective opposed ends.

A plurality of spacer members 104 are secured between the stringers 62, 64 and the side frame members 80, 82 at longitudinally spaced intervals, the spacers also serving as abutments in a manner to be described.

The side walls 105, 106 of the body 60 are identically constructed and each is seen to comprise a pair of elongated substantially rectangular upper and lower panels 107, 110 and an intermediate elongated substantially rectangular panel 108, the panels being connected together in laterally spaced relation by means of a plurality of cross braces 112 fixedly secured to the outer sides of the walls 105, 106.

A pair of substantially rectangular guide rails 114, 116 are fixedly connected to the panels 107, 108, 110 at each end thereof in laterally spaced and substantially parallel relation to form a guide track 118 therebetween.

One plate 120 of a plurality of hinges 122 is fixedly secured to the lower side of the panel 110 and the other plate 124 thereof is fixedly secured between the side frame members 80, 82 and a second pair of side frame members 126, 128 superimposed thereover, respectively.

Reference numeral 130 designates a threshold for a rear wall 132, the threshold extending between the opposed confronting guide rails 114, 116 at the rear of the body 60 and is secured to the member 92. A similar threshold 134 for a front wall 136 extends between the confronting guide rails 114, 116 at the front end of the vehicle body and is secured to the member 74.

Each of the walls 132, 136 is slidably mounted in the opposed confronting guide slots 118 at each end of the vehicle body, and each of the walls 132, 136 includes a substantially rectangular panel 138 across which transversely extends adjacent the upper end thereof a cross bar 140. Each end of the bars 140 has an eye screw 142 affixed thereto, the screws 142 releasably receiving a latch member 144 therein. As is seen in Figure 5, the latch member 144 is pivotally connected to eye screws 146 carried at each end of the panel 107.

From the foregoing description of the vehicle body 60, the versatility of the same must now be quite apparent. Assuming that the component elements thereof are disclosed in the manner illustrated in Figures 1 and 4, the vehicle body 60 is seen to be supported on the conventional child's wagon or cart 10. It is obvious from inspection of the drawings that the volumetric capacity of the vehicle body 60 is much greater than the capacity of the wagon or cart 10. This makes possible the carrying of increased loads without altering or modifying any of the elements or parts of the conventional wagon 10.

Figure 2:
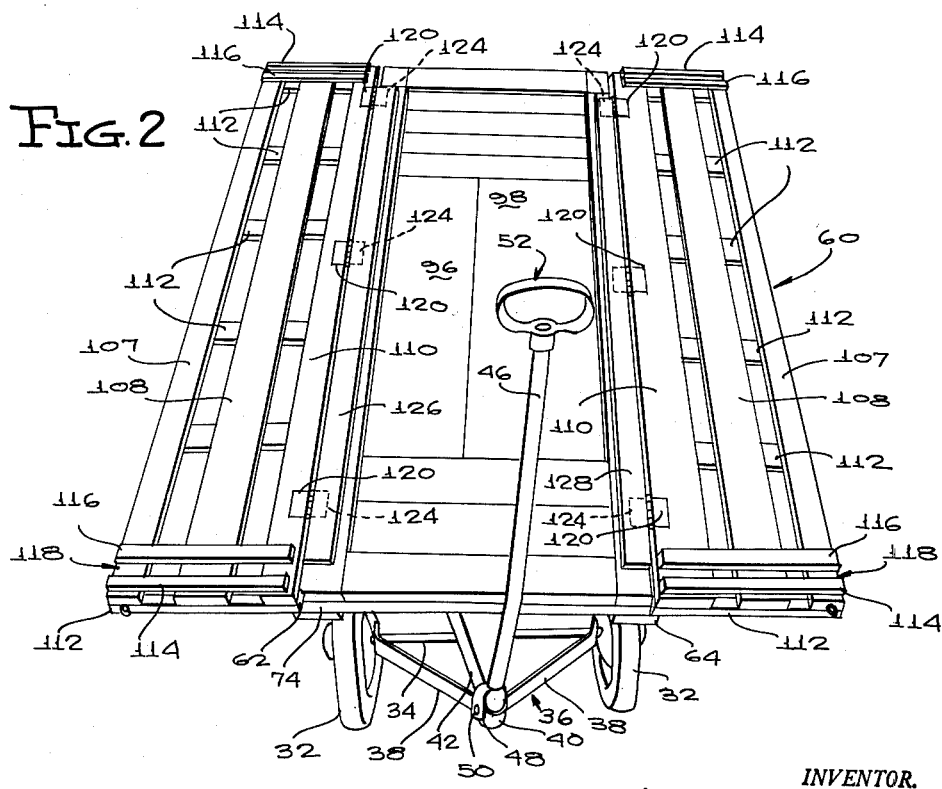
Figure 2 is a perspective view of the auxiliary body in its second operative position.

Again, the user may increase the load carrying area by removing the latch 144 from the eye screw 142 and thereafter removing the walls 132, 136 from between their respective guide rails 114, 116. The side walls of the vehicle body 60 may then be folded from the full line position shown in Figure 1 to the full line position illustrated in Figure 2. With the sides 105, 106 of the vehicle body 60 in their lowered position, it is seen that the lower ends of the cross braces 112 abut against the spacers 104 which limits the pivotal movement of the sides 105, 106 and that substantially simultaneously therewith, the outer faces of the cross braces 112 engage against and are supported on the outer marginal edges of the stringers 62, 64.

In the event it is not desired to uitlize the vehicle body 60, the same may be removed from the wagon 10 through the simple expedient of lifting the same therefrom.

Assuming again that the component parts of the vehicle body 60 are assembled as illustrated in Figures 1 and 3, provision has been made for obtaining a still greater load carrying capacity. In this connection, reference is made to the removable floor section 94 which, when removed from the abutment elements 66, 68 provides access into the interior of the wagon 10.

Having described and illustrated one embodiment of this invention in detail, it will be understood that the same is offered merely by way of example, and that this invention is to be limited only by the scope of the appended claims.

What is claimed is:

1. In combination with a children's wheeled wagon having a body including a bottom wall, a pair of oppositely disposed laterally spaced and substantially vertical side walls, and a pair of longitudinally spaced and substantially parallel vertical end walls, an auxiliary body, said auxiliary body being removably supported on the upper ends of said side and end walls of said wagon, said auxiliary body comprising a pair of elongated substantially rectangular stringers, said stringers being disposed in laterally spaced and substantially parallel relation reative to each other, said stringers engaging on and extending over said upper ends of said side walls of said wagon and adjacent portions of the end walls thereof, said stringers extending forwardly and rearwardly of said end walls of said wagon, a pair of elongated substantially rectangular side frame members, said side frame members being disposed in laterally spaced and substantially parallel relation relative to each other, said side frame members being disposed in vertically spaced relation relative to said stringers and extending substantially parallel thereto, said side frame members having portions thereof projecting rearwardly beyond the rear ends of said stringers, a bottom wall for said auxiliary body, means for supporting said last named bottom wall extending between said stringers and said side frame members, said last named bottom wall having longitudinally extending marginal side edges disposed intermediate said stringers and said side frame members, means connecting together said stringers and said side frame members, a pair of elongated substantially rectangular side walls for said auxiliary body, said last named side walls being disposed in laterally spaced and substantially parallel relation relative to each other, means pivotally connecting said last named side walls to said side frame members, said side frame members serving as abutment means to limit the pivotal movement of said last named side walls in one direction, a pair of longitudinally spaced substantially rectangular end walls slidably engaged with said last named side walls, said last named end walls being substantially parallel with respect to each other, and means releasably connecting said last mentioned end walls to said last mentioned side walls, and depending cross braces secured to and extending transverse to the stringers and engaging the first-named end walls inwardly of the wagon body to prevent longitudinal movement of the auxiliary body relative to the wagon.

2. In the combination defined in claim 1, and means releasably connecting said last named side walls to said side frame members.

3. In the combination defined in claim 2, and said last named bottom wall being removable to provide access into the interior of the body of the said wagon.

References Cited in the file of this patent

UNITED STATES PATENTS

| | | |
|---|---|---|
| 773,239 | Stone | Oct. 25, 1904 |
| 1,060,418 | Beach et al. | Apr. 29, 1913 |
| 1,441,859 | Klimcovitz | Jan. 9, 1923 |
| 1,478,831 | Long et al. | Dec. 25, 1923 |
| 2,546,519 | Podnar | Mar. 27, 1951 |
| 2,557,347 | Haynes | June 19, 1951 |